(12) United States Patent
Hegenbart et al.

(10) Patent No.: US 12,420,952 B2
(45) Date of Patent: Sep. 23, 2025

(54) METHOD FOR FASTENING A PART TO ANOTHER PART USING ELECTRICALLY DEFORMABLE RIVETS

(71) Applicant: Airbus Operations GmbH, Hamburg (DE)

(72) Inventors: Matthias Hegenbart, Hamburg (DE); Hermann Benthien, Hamburg (DE); Peter Linde, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 188 days.

(21) Appl. No.: 18/342,253

(22) Filed: Jun. 27, 2023

(65) Prior Publication Data
US 2024/0002071 A1    Jan. 4, 2024

(30) Foreign Application Priority Data

Jun. 29, 2022  (EP) .................................. 22181933

(51) Int. Cl.
| | |
|---|---|
| *F16B 5/04* | (2006.01) |
| *B29C 65/00* | (2006.01) |
| *B29C 65/60* | (2006.01) |
| *B64F 5/10* | (2017.01) |
| *F16B 5/06* | (2006.01) |
| *F16B 21/00* | (2006.01) |

(52) U.S. Cl.
CPC .............. *B64F 5/10* (2017.01); *B29C 65/605* (2013.01); *B29C 66/1122* (2013.01); *B29C 66/30321* (2013.01); *B29C 66/721* (2013.01); *B29C 66/723* (2013.01); *F16B 5/04* (2013.01); *F16B 5/0642* (2013.01); *F16B 21/00* (2013.01); *B29C 66/0246* (2013.01); *F16B 2200/77* (2023.08)

(58) Field of Classification Search
CPC .......... B29C 66/30321; B29C 66/0246; B29C 66/1122; F16B 5/04; F16B 2200/77; F16B 21/00
See application file for complete search history.

(56) References Cited

U.S. PATENT DOCUMENTS

| | | | |
|---|---|---|---|
| 2013/0042461 A1* | 2/2013 | Tupper | B29C 66/73715 403/29 |
| 2016/0265570 A1* | 9/2016 | Sabau | B29C 66/0246 |
| 2017/0355151 A1 | 12/2017 | Jörn et al. | |

FOREIGN PATENT DOCUMENTS

| | | |
|---|---|---|
| DE | 102019123305 A1 | 3/2021 |
| DE | 102019128914 A1 | 4/2021 |

OTHER PUBLICATIONS

European Search Report for corresponding European U.S. Appl. No. 22/181,933 dated Dec. 5, 2022; priority document.

(Continued)

*Primary Examiner* — Scott W Dodds
(74) *Attorney, Agent, or Firm* — Greer, Burns & Crain, Ltd.

(57) ABSTRACT

Methods for fastening two fiber composite parts to each other with a fastener that includes electroactive polymer material. The parts have an opening within an inner circumferential surface. Fibers protrude from the inner circumferential surface into the opening and interlock with chains of micrograins of the electroactive polymer material. The fastener may switch between an activated state and a deactivated state and in the deactivated state, the fastener engages the exposed fibers.

11 Claims, 3 Drawing Sheets

(56) References Cited

OTHER PUBLICATIONS

Li, Y., et al., "Soft and Flexible PEDOT/PSS Films for Applications to Soft Actuators," Smart Materials and Structures, 23(7): 074010, Jun. 2014 (Abstract Only).
Zhou, J., et al., "The Temperature-Dependent Microstructure of PEDOT/PSS Films: Insights from Morphological, Mechanical and Electrical Analyses," J. Materials Chemistry, C2:9903-9910, Jun. 2014 (Abstract Only).

* cited by examiner

METHOD FOR FASTENING A PART TO ANOTHER PART USING ELECTRICALLY DEFORMABLE RIVETS

CROSS-REFERENCES TO RELATED APPLICATIONS

This application claims the benefit of European Patent Application No. 22 181 933-7 filed on Jun. 29, 2022, the entire disclosure of which is incorporated herein by way of reference.

FIELD OF THE INVENTION

The invention relates to a method for fastening a first fiber composite part to a second fiber composite part.

For composite airframes of commercial aircraft, the joining of primary parts is still dominated by riveting. This riveting is performed in multiple rows, and is usually showing a considerable redundancy in terms of static behavior. The riveting process has been developed to a reliable and accurate way of joining elements, however, the typical minimum steps in the process remain largely unchanged. The riveting, although a joining method with high safety and high redundancy, is time consuming, noisy, and prevents weight reduction.

BACKGROUND OF THE INVENTION

Li, Y., Tanigawa, R., Hidenori, H., Soft and flexible PEDOT/PSS films for applications to soft actuators, Smart Materials and Structures, 23(7): 074010, June, 2014 discloses the fabrication of PEDOT/PSS films.

Zhou, J., Anjum, D., Chen, L., Lubinaeu, G., The temperature-dependent micro structure of PEDOT/PSS films: Insights from morphological, mechanical and electrical analyses, J. Materials Chemistry, C2:9903-9910, June, 2014 discusses the effects of temperature on the micro structure of PEDOT/PSS films.

DE 10 2019 123 305 A1 discloses a method of joining of two fiber composite components by creating joining surfaces on the components by means of laser radiation such that the fibers of the fiber composite components are exposed.

DE 10 2019 128 914 A1 discloses a fastening device for temporary fastening of components, comprising a connecting element, which comprises at least one electroactive polymer element, for temporary fastening. The connecting element is designed in such a way that, in the active state, it can be inserted into an opening and, in the passive state, produces a force-fit connection with the components.

SUMMARY OF THE INVENTION

It is an object of the invention to provide an improved fastening method for primary parts of an aircraft.

The object may be achieved by the subject-matter of one or more embodiments described herein. Preferred embodiments are also described herein.

The invention provides a method for fastening a first fiber composite part to a second fiber composite part each composite part including a matrix material and fibers embedded therein, the method comprising:

a) forming an opening, that has an inner circumferential surface, in the first and second fiber composite part;
b) removing matrix material from the inner circumferential surface so as to expose the fibers;
c) activating a fastener, that includes electroactive polymer material, so as to reduce a diameter of the fastener and inserting the activated fastener into the opening;
d) deactivating the fastener inside the opening so that the diameter of the fastener increases and an outer circumferential surface of the deactivated fastener engages the exposed fibers and optionally the inner circumferential surface.

Preferably, step a) comprises cutting the opening into the first and second fiber composite part. Preferably, step a) comprises drilling the opening into the first and second fiber composite part.

Preferably, step b) comprises evaporating the matrix material. Preferably, step a) comprises cutting the opening into the first and second fiber composite part. the matrix material is evaporated by electromagnetic radiation, preferably laser radiation. Preferably, step b) comprises laser milling the inner circumferential surface.

Preferably, step c) comprises activating the fastener by applying a voltage to the electroactive polymer material.

Preferably, step c) comprises inserting the activated fastener by a robotic arm. Preferably, the electroactive polymer material is supplied with voltage through the robotic arm.

Preferably, in step c) the activated fastener is inserted to protrude from the opening. Preferably, in step d) the deactivated fastener recedes to be flush with or recessed from a surface of the first and/or second fiber composite part.

Preferably, in step c) the activated fastener engages the exposed fibers. Preferably, the activated fastener engages the exposed fibers with a portion that includes electroactive polymer material such that the exposed fibers and micro-grains of the electroactive polymer material are able to slide against each other.

Preferably, in step d) the deactivated fastener engages the exposed fibers with a portion that includes electroactive polymer material such that the exposed fibers and micro-grains of the electroactive polymer material are interlocked.

The invention provides a machine tool arrangement configured for performing a preferred method, the machine tool arrangement comprising:
a first work implement configured for performing step a);
a second work implement configured for performing step b);
a third work implement configured for handling a fastener;
a voltage supply that is operatively coupled to the third work implement for supplying voltage to a fastener that is held in the third work implement, and
a controller that includes instructions, that upon execution by the controller, cause the work implements and the voltage supply to perform a preferred method.

The invention provides a fiber composite part arrangement comprising:
a first fiber composite part and a second fiber composite part, each composite part including a matrix material and fibers embedded therein and having an opening with an inner circumferential surface that has exposed fibers that protrude into the opening;
a fastener that includes electroactive polymer material and is switchable between an activated and a deactivated state, wherein the fastener is inserted into the opening and, when in the deactivated state, engages the exposed fibers and optionally the inner circumferential surface.

Preferably, the opening is cut, preferably drilled, into the first and second fiber composite part.

Preferably, when in the activated state, the activated fastener protrudes from the opening. Preferably, when in the deactivated state, the deactivated fastener is flush with or recessed from a surface of the first and/or second fiber composite part.

Preferably, when in an activated state, the activated fastener engages the exposed fibers.

Preferably, when in an activated state, the activated fastener engages the exposed fibers with a portion that includes electroactive polymer material such that the exposed fibers and micrograins of the electroactive polymer material are able to slide against each other.

Preferably, when in the deactivated state, the deactivated fastener engages the exposed fibers with a portion that includes electroactive polymer material such that the exposed fibers and micrograins of the electroactive polymer material are interlocked.

The invention provides an aircraft structure, preferably a fuselage, for an aircraft comprising a preferred fiber composite part arrangement.

The invention provides an aircraft comprising a preferred fiber composite part arrangement and/or a preferred aircraft structure.

An electro-active polymer (EAP) is usually a laminate, having two electrodes bridged by an intermediate elastic polymer layer. For the conductive layer (electrodes) a conductive polymer may be used, such as Poly (3, 4 ethylendioxythiophene)/polystyrene sulfonate, known as PEDOT/PSS. This material is highly electrically conductive and highly mechanically stretchable.

For the elastic polymer a Thermoplastic Polurethane-Elastomer may be used, such as Epurex LPT 4207 CU-T. This polymer displays a compressive strength above 50 MPa and by this has reached a level sufficient for making up a layer in a structural composite.

A particular type of EAP, with a flat polymer and two thin elastic electrodes, is referred to as dielectric polymer. When the two electrodes are disconnected from any voltage source, the thickness direction of the EAP is in an expanded state, also known as its "inactive state", or the "passive" state.

If the electrodes are connected to a voltage source, they will be attracted to each other by electrostatic pressure (Coulomb forces), and will squeeze the polymer layer in between, so that it contracts over the thickness direction. Contraction rates may vary between 10% to 35% and may for some EAPs be even considerably larger. In the in-plane direction an expansion occurs simultaneously. In the contracted state, the two electrodes are pressed towards each other, so that the thickness of the EAP is reduced. At the same time, the in-plane dimensions, i.e. length and width, increase, due to Poisson's ratio. In the active state, electricity is flowing through the electrodes, increasing the temperature, which is influencing the mechanical properties of the PEDOT and PSS micrograins. In the passive state the electric current stops and the bond between PEDOT and PSS microstructure increases again.

A laser beam with high energy is capable of creating high temperatures in materials. With sufficient energy it is possible to evaporate both polymer matrix and carbon fibers. This has become a popular process to shape CFRP materials, and is also known as "laser milling".

With a reduced energy it has become possible to evaporate only the polymer matrix and leave carbon fibers more or less unaffected. Directing a laser beam with reduced energy perpendicular to e.g. a CFRP laminate, it is thus possible to create e.g. a cut-out, along which sides, short carbon fibers are protruding.

This has been suggested for use in order to increase mechanical force transfer, if the process has been used on one of both parts in a joint. It is then necessary to provide to the protruding fibers to penetrate the other part's surface. Often this is performed by using a semi cured material.

The basic idea of the invention is a measure for achieving rivet connections in GFRP and CFRP joints with fastener elements that are flush with both surfaces, and that needs no large force to be set. The method is preferably based on a cylindrical form of the Electro Active Polymer (EAP) which slips thought the opening in the active state, and expands in the opening in the passive state.

Carbon fibers or glass fibers in the parts to be joined are protruding into the opening as a result of laser milling the opening circumference with a laser beam with reduced energy. The protruding carbon fibers are penetrating the EAP fastener when it expands in the opening upon disconnecting the closed circuit. The heated outer EAP electrode's material PEDOT/PSS is influenced by the Joule effect of the electrical current and more easily allows penetration of carbon fibers into the electrode material. Upon cooling down, the bond between PEDOT/PSS micrograins is stabilized again, and the carbon fibers are bridging the joint between the parts and the fastener.

Thus, flush surfaces on both sides can be provided. Furthermore, the fastener is easy to manufacture and may provide a high out of plane shear transfer between fastener and surrounding material, preferably via the protruding fibers that bridge the joint. This EAP fastener also needs relatively little shrinking (active state) to slip through an opening.

Preferably an opening is drilled between the parts to be joined. The circumference of the opening is laser milled with reduced energy, leaving protruding carbon fibers inside the opening, in all directions that are present within the laminate. The fibers for each ply will protrude into the opening in their respective fiber directions. In this manner protruding fibers will be distributed around the surface of an EAP fastener, and create force transfer in all directions.

Preferably, the electrodes are tube shaped, and placed inside each other, separated by an elastomer. In the passive state the cylinder is shorter and displays a thicker diameter. In the active state, in which the two electrodes are pulled towards each other, and thus the diameter of the fastener decreases, whereas the length of the fastener increases.

The EAP fastener is kept in an active state and preferably placed in the opening by a robotic arm with a grip. The active state results in the diameter of the EAP fastener element to be decreased and be able to slip through the opening. The electric circuit is disconnected and the element shrinks in length and expands in width. The microstructure of the outer electrode, made of PEDOT/PSS is penetrated by the protruding carbon fibers of the surrounding material when the EAP element starts to fill the opening. As the material cools down the microstructure regains its bonds between PEDOT/PSS and the carbon fibers are bridging the joint. The bridging takes place in all fiber directions that the laminate displays. The fastening process is performed without rivet tools and results in flush connections.

Suitable applications include but are not limited to the secondary airframe and cabin parts made of GFRP or CFRP.

The fasteners may be configured to be flush on both sides. With this the fasteners are particularly useful for aerodynamic parts (lower drag), acoustics (lower noise), and allows reduced fuel consumption. The bridging carbon fibers allow a high out of plane shear transfer between fastener and joined parts. The fastener may have a single diameter. The weight of the rivet connection is reduced compared to metallic rivets. The fastening may be done without any tools.

Furthermore, the idea is suitable for automatization. The reverse process is possible without damage to any of the materials

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

Figure 1:
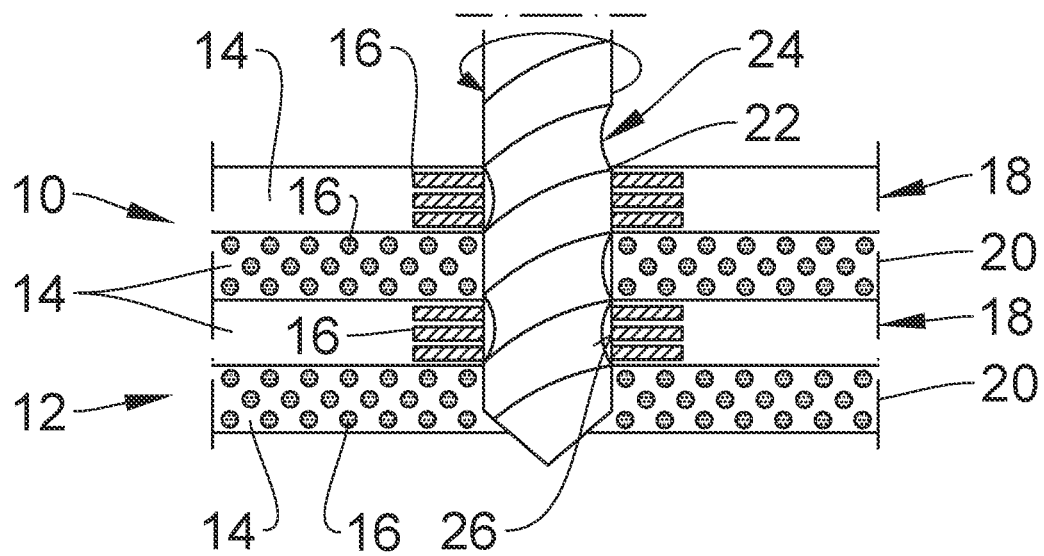
FIG. 1 depicts opening forming in fiber composite parts.

Referring to FIG. 1, a first fiber composite part 10 and a second fiber composite part 12 are depicted. The fiber composite parts 10, 12 are intended to be fastened together. Each fiber composite part 10, 12 includes a matrix material 14 and fibers 16 that are embedded therein. As exemplified in FIG. 1, each fiber composite part 10, 12 includes two layers that have a different orientation of the embedded fibers 16. In a first layer 18, the fibers 16 are aligned in parallel to the drawing plane. In a second layer 20 the fibers 16 are aligned perpendicular to the drawing plane. It should be noted that the fiber composite parts 10, 12 may have several more layers that also may have different orientations. The invention is applicable regardless.

The fiber composite parts 10, 12 may be structural parts of an aircraft, for example frames that are going to be fastened together, or a frame and a skin panel, or any other structural parts of an aircraft that are typically riveted together.

As shown in FIG. 1, an opening 22 is created in both fiber composite parts 10, 12, preferably using a mechanical drill 24. The opening 22 includes an inner circumferential surface 26.

Figure 2:
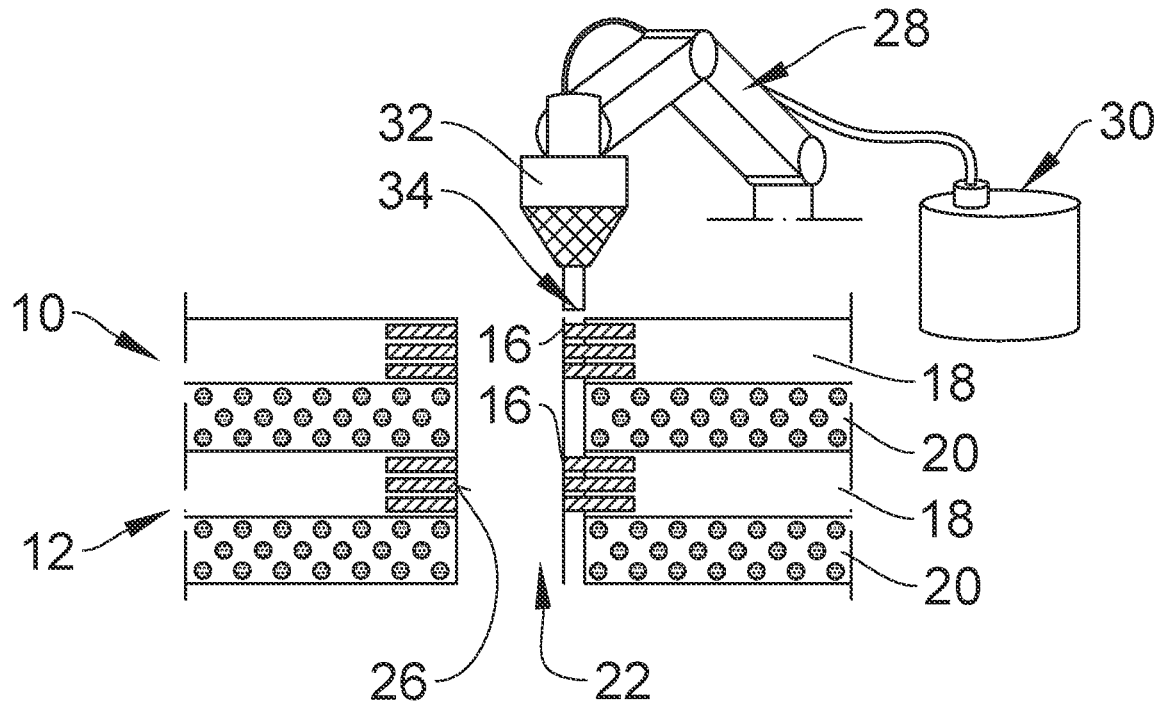
FIG. 2 depicts fiber exposing in the opening circumference.

Referring to FIG. 2, laser milling is performed. As depicted, a laser mill 28 may include a robotic arm that has a laser source 30 that is connected to a work implement 32 which outputs a laser beam 34 towards the inner circumferential surface 26. The power of the laser beam 34 is chosen such that the matrix material 14 can be evaporated, while leaving the fibers 16 unaffected. As a result, a new inner circumferential surface 26 is generated, from which the fibers 16 protrude into the opening. In other words, the fibers 16 are exposed and protrude from the inner circumferential surface 26 into the opening 22.

Figure 3:
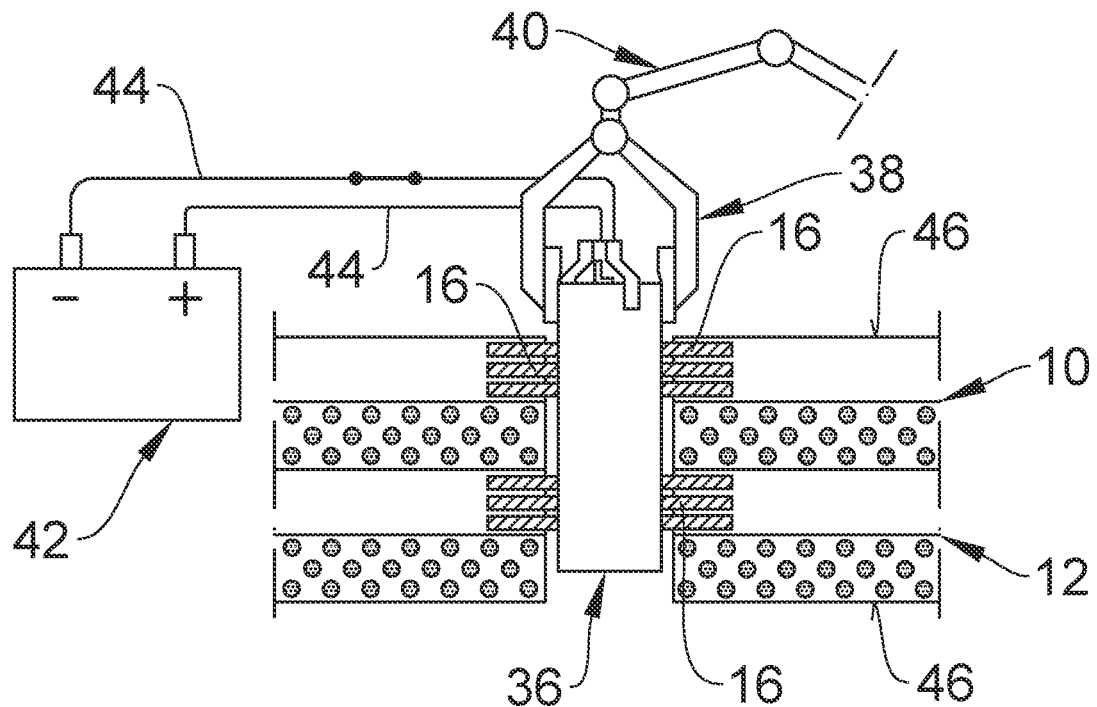
FIG. 3 depicts fastener insertion into the opening.

As depicted in FIG. 3, a fastener 36 is inserted into the opening 22. The fastener 36 comprises an electroactive polymer and may thus be deformed by applying a voltage to the electroactive polymer material. For a detailed explanation reference is made to DE 10 2019 128 914 A1, FIGS. 2a and 2b, paragraphs [0047]-[0049], the disclosure is explicitly incorporated herein by reference.

The fastener 36 is handled by another work implement 38 that is preferably arranged at a robotic arm 40. Furthermore, the fastener 36 is connected to a voltage source 42. While not depicted here, the leads 44 connecting the fastener 36 to the voltage source 42, may be integrated into the work implement 38 and/or the robotic arm 40.

After forming the opening 22 and subsequent to removing the matrix material, the fastener 36 is supplied from the voltage source 42. As a result of the electroactive polymer material, the fastener contracts in the radial direction and expands in the axial direction. Consequently, the diameter of the fastener 36 is smaller than the diameter of the opening 22. The fastener 36 is inserted such that it protrudes from the opening on both sides relative to an outer surface 46 of each fiber composite part 10, 12.

Figure 4:
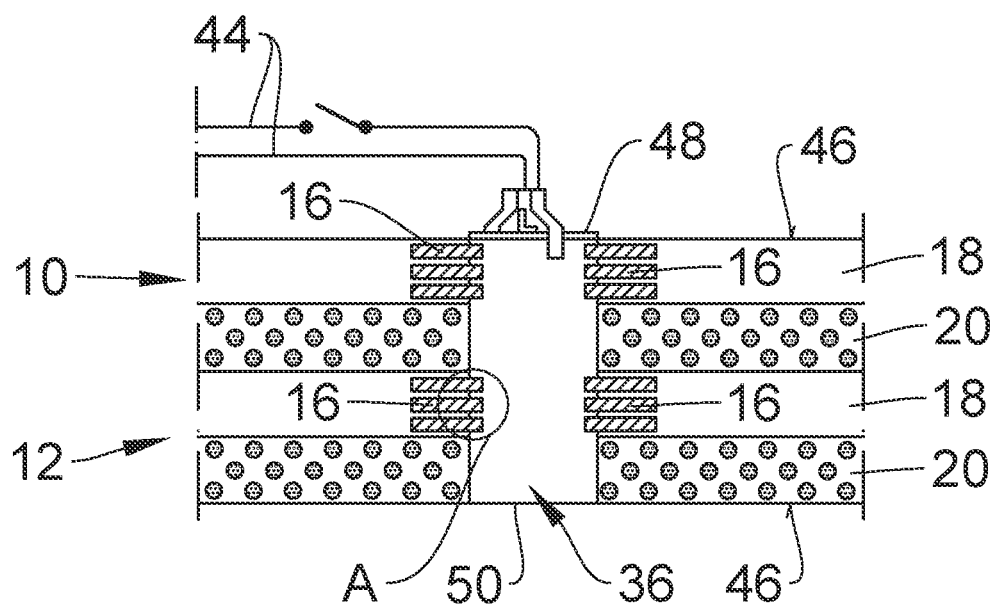
FIG. 4 depicts fastener expansion in the opening.

As depicted in FIG. 4, the fastener 36 is separated from the voltage source 42. Thereby, the electroactive polymer material reverts back to its normal configuration. As a result, the fastener expands in the radial direction and contracts in the axial direction. The fastener 36 is dimensioned such that in this deactivated state, the fastener top surface 48 and the fastener bottom surface 50 are flush with the outer surface 46 of the fiber composite parts 10, 12. It is also possible, that the fastener 36 is dimensioned such the top and bottom surfaces 48, 50 are slightly recessed relative to the outer surface 46.

Figure 5:
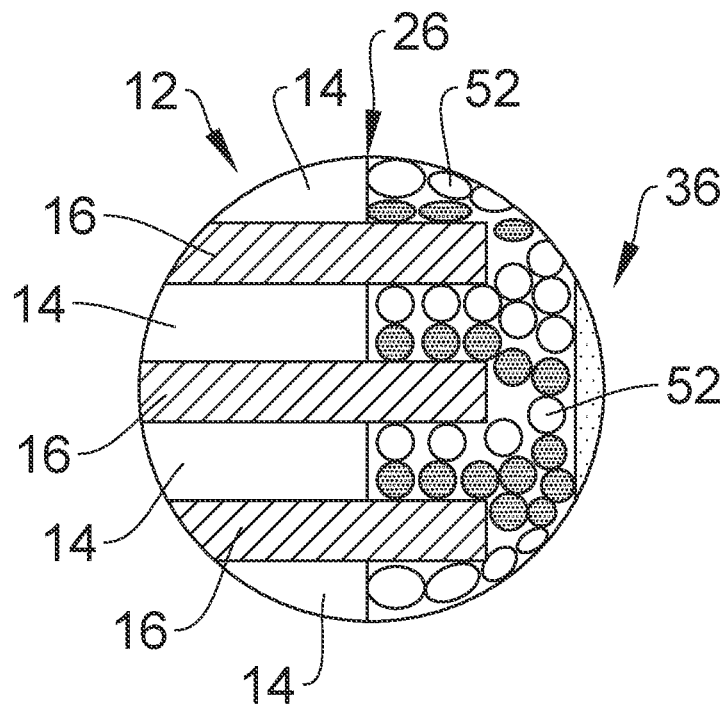
FIG. 5 depicts detail A of FIG. 4 with the fastener in an active state.
Figure 6:
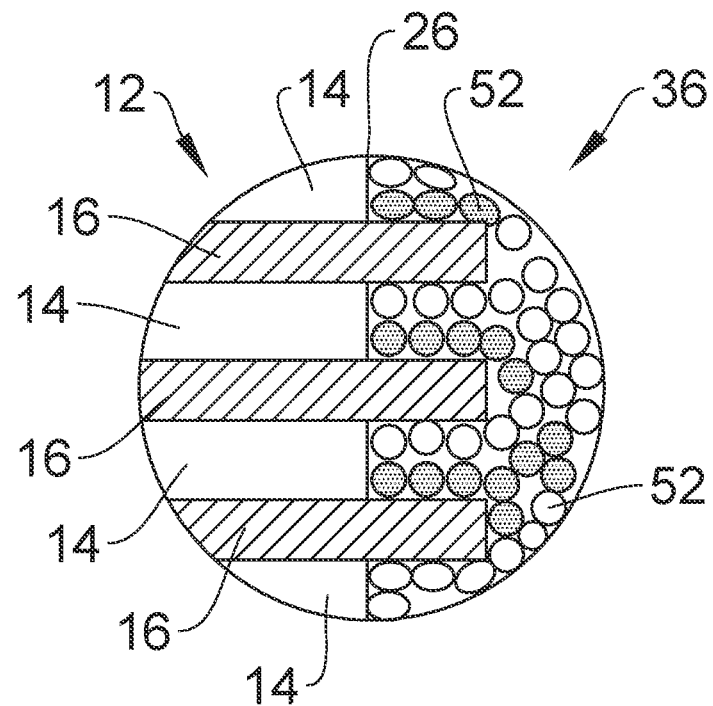
FIG. 6 depicts detail A of FIG. 4 with the fastener in a passive state.

Referring to FIG. 5 and FIG. 6, the interface region between the fastener 36 and the inner circumferential surface 26 is described in more detail (circle A in FIG. 4).

FIG. 5 depicts on the left a portion of the second fiber composite part 12. The fibers 16 protrude from the inner circumferential surface 26 that is formed by the matrix material 14. To the right of FIG. 5, a portion of the fastener 36 is depicted. As described herein, the electroactive polymer material includes two different polymers, namely PEDOT and PSS. Both these polymers form micrograins 52. As depicted in FIG. 5, the micrograins 52 form small chains that extend towards the inner circumferential surface 26 and are arranged in an alternating manner with the exposed fibers 16.

In FIG. 5, the fastener 36 or rather the electroactive polymer material is supplied from the voltage source 42. In this activated state, the temperature of the fastener 36 rises and the bond between the micrograins 52 is weakened. As a result, the exposed fibers 16 and the electroactive polymer material are able to slide relative to each other, which results in the fastener 36 being able to be inserted into the opening 22.

Referring to FIG. 6, the fastener 36 is separated from the voltage source 42 and the bond between the micrograins 52 of the electroactive polymer material has strengthened again. In this configuration the exposed fiber 16 and the chains formed by the micrograins 52 are interlocked and cannot be moved relative to each other without substantial force being introduced. Consequently, the fastener 36 is positively locked with the first and second fiber composite parts 10, 12 and prevents their separation along the axial direction of the fastener 36. Thus, the first and second fiber composite parts are fastened to each other.

In order to reverse this process, the fastener 36 is connected to the voltage source 42 again, which reduces the diameter of the fastener 36 and weakens the bond between the micrograins 52 thereby allowing a pushing of the fastener 36 out of the opening 22.

In contrast to a usual rivet connection, this rivet like connection can be engaged and disengaged without destroying any of the parts 10, 12 or fasteners 36.

In order to improve fastening of structural parts to each other that are usually riveted, the invention proposes a fastener (36) that includes electroactive polymer material. The parts (10, 12) have an opening (22) within an inner circumferential surface (26). Fibers (16) protrude from the inner circumferential surface (26) into the opening (22) and interlock with chains of micrograins (52) of the electroactive polymer material.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 first fiber composite part
12 second fiber composite part
14 matrix material
16 fibers
18 first layer
20 second layer
22 opening
24 mechanical drill
26 inner circumferential surface
28 laser mill
30 laser source
32 work implement
34 laser beam
36 fastener
38 work implement
40 robotic arm
42 voltage source
44 leads
46 outer surface
48 fastener top surface
50 fastener bottom surface
52 micrograins

The invention claimed is:

1. A method for fastening a first fiber composite part to a second fiber composite part each fiber composite part including a matrix material and fibers embedded therein, the method comprising:
    a) forming an opening, that has an inner circumferential surface, in the first and second fiber composite parts;
    b) removing matrix material from the inner circumferential surface so as to expose fibers;
    c) activating a fastener, that includes electroactive polymer material, so as to reduce a diameter of the fastener and inserting the activated fastener into the opening;
    d) deactivating the fastener inside the opening so that the diameter of the fastener increases and an outer circumferential surface of the deactivated fastener engages the exposed fibers.

2. The method according to claim 1, wherein step a) comprises cutting the opening into the first and second fiber composite parts.

3. The method according to claim 1, wherein step b) comprises evaporating the matrix material.

4. The method according to claim 3, wherein the matrix material is evaporated by electromagnetic radiation.

5. The method according to claim 1, wherein step c) comprises activating the fastener by applying a voltage to the electroactive polymer material.

6. The method according to claim 1, wherein step c) comprises inserting the activated fastener by a robotic arm.

7. The method according to claim 6, wherein the electroactive polymer material is supplied with voltage through the robotic arm.

8. The method according to claim 1, wherein in step c) the activated fastener is inserted to protrude from the opening and wherein in step d) the deactivated fastener recedes to be flush with or recessed from a surface of the first, the second, or both fiber composite parts.

9. The method according to claim 1, wherein in step c) the activated fastener engages the exposed fibers.

10. The method according to claim 9, wherein the activated fastener engages the exposed fibers with a portion that includes electroactive polymer material such that the exposed fibers and micrograins of the electroactive polymer material are able to slide against each other.

11. The method according to claim 1, wherein in step d) the deactivated fastener engages the exposed fibers with a portion that includes electroactive polymer material such that the exposed fibers and micrograins of the electroactive polymer material are interlocked.

\* \* \* \* \*